(12) United States Patent
Patten, Jr. et al.

(10) Patent No.: US 11,188,320 B2
(45) Date of Patent: *Nov. 30, 2021

(54) SYSTEMS AND METHODS FOR UPDATING DETECTION MODELS AND MAINTAINING DATA PRIVACY

(71) Applicant: International Business Machines Corporation, Armonk, NY (US)

(72) Inventors: Willie R. Patten, Jr., Hurdle Mills, NC (US); Eugene I. Kelton, Mechanicsburg, PA (US); Yi-Hui Ma, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/577,774

(22) Filed: Sep. 20, 2019

(65) Prior Publication Data

US 2021/0089293 A1 Mar. 25, 2021

(51) Int. Cl.
*G06F 8/65* (2018.01)
*H04L 29/06* (2006.01)
*H04L 29/08* (2006.01)

(52) U.S. Cl.
CPC .............. *G06F 8/65* (2013.01); *H04L 63/10* (2013.01); *H04L 67/34* (2013.01)

(58) Field of Classification Search
CPC .... G06F 8/65; G06F 16/2358; G06F 16/2379; H04L 63/10; H04L 63/1408; H04L 67/10; H04L 67/34

(Continued)

(56) References Cited

U.S. PATENT DOCUMENTS

| 5,819,226 A | 10/1998 | Gopinathan et al. |
| 8,014,597 B1 | 9/2011 | Newman |

(Continued)

FOREIGN PATENT DOCUMENTS

| CN | 106610854 A | 5/2017 |
| CN | 107229966 A | 10/2017 |

(Continued)

OTHER PUBLICATIONS

Edge, Michael, et al., "Towards a Proactive Fraud Management Framework for Financial Data Streams," Third IEEE International Symposium on Dependable, Autonomic and Secure Computing, IEEE Computer Society, 2007, pp. 55-62.

(Continued)

*Primary Examiner* — Wei Y Zhen
*Assistant Examiner* — Mohammed N Huda
(74) *Attorney, Agent, or Firm* — Troutman Pepper Hamilton Sanders LLP

(57) ABSTRACT

The present application relates to systems for updating detection models and methods for using the same. The systems and methods generally comprise at least one local node comprising a monitoring module, a diagnosis module, and an evaluation module The system receives at least one model update, and analyzes the model update and current models and data present in the local node, and determines if the update should be applied. In some embodiments, a local node can generate a model update for use in other local nodes, while not sharing private data present in the local node.

16 Claims, 7 Drawing Sheets

(58) Field of Classification Search
USPC .................................................. 717/172, 168
See application file for complete search history.

(56) References Cited

U.S. PATENT DOCUMENTS

| | | | |
|---|---|---|---|
| 8,438,089 | B1 | 5/2013 | Wasserblat et al. |
| 8,621,065 | B1 | 12/2013 | Saurel et al. |
| 8,935,788 | B1 | 1/2015 | Lili |
| 9,237,162 | B1 | 1/2016 | Saurel et al. |
| 9,508,075 | B2 | 11/2016 | Geckle et al. |
| 9,576,262 | B2 | 2/2017 | Ganguly et al. |
| 10,290,053 | B2 | 5/2019 | Priess et al. |
| 10,467,615 | B1 | 11/2019 | Omojola et al. |
| 2002/0085646 | A1 | 7/2002 | Brown et al. |
| 2004/0255167 | A1 | 4/2004 | Knight |
| 2006/0031466 | A1 | 2/2006 | Kovach et al. |
| 2008/0306872 | A1 | 12/2008 | Felsher |
| 2011/0208588 | A1 | 8/2011 | Joa et al. |
| 2013/0103372 | A1 | 4/2013 | Hogg et al. |
| 2015/0310606 | A1 | 10/2015 | Shreve et al. |
| 2015/0326591 | A1 | 11/2015 | Bernard et al. |
| 2015/0339668 | A1 | 11/2015 | Wilson et al. |
| 2016/0294614 | A1* | 10/2016 | Searle et al. ............... G06F 8/65 |
| 2017/0063896 | A1* | 3/2017 | Muddu et al. ...... H04L 63/1408 |
| 2017/0148027 | A1 | 5/2017 | Yu et al. |
| 2017/0193787 | A1 | 7/2017 | Devdas et al. |
| 2018/0000385 | A1 | 1/2018 | Heaton et al. |
| 2018/0018590 | A1 | 1/2018 | Szeto et al. |
| 2018/0025286 | A1 | 1/2018 | Gorelik et al. |
| 2018/0174154 | A1 | 6/2018 | Bhattacharjee et al. |
| 2018/0276710 | A1 | 9/2018 | Lietzen et al. |
| 2019/0073647 | A1 | 3/2019 | Zoldi et al. |
| 2019/0167014 | A1 | 6/2019 | Seiss et al. |
| 2019/0260784 | A1 | 8/2019 | Stockdale et al. |
| 2020/0314092 | A1 | 10/2020 | Seul et al. |

FOREIGN PATENT DOCUMENTS

| | | |
|---|---|---|
| CN | 107564522 A | 1/2018 |
| CN | 108170695 A | 6/2018 |
| CN | 108241561 A | 7/2018 |
| CN | 108345794 A | 7/2018 |
| CN | 108921301 A | 11/2018 |
| CN | 109978177 A | 7/2019 |
| CN | 110505047 A | 11/2019 |
| WO | 2014160296 A1 | 10/2014 |
| WO | 2017091443 A1 | 6/2017 |
| WO | 2018213205 A1 | 11/2018 |
| WO | 2019075399 A1 | 4/2019 |

OTHER PUBLICATIONS

Henke, Márcia, et al., "Analysis of the Evolution of Features in Classification Problems with Concept Drift: Application to Spam Detection," 2015 IFIP/IEEE International Symposium on Integrated Network Management (IM), IEEE, 2015.

Yao, Danfeng, et al., "Anomaly Detection as a Service: Challenges, Advances, and Opportunities," Synthesis Lectures on Information Security, Privacy, and Trust, Oct. 2017, 173 pages.

Vanhaesebrouck, Paul, et al., "Decentralized Collaborative Learning of Personalized Models over Networks," International Conference on Artificial Intelligence and Statistics (AISTATS), Apr. 2017.

International Search Report and Written Opinion dated Dec. 24, 2020 in related International Patent Application No. PCT/IB2020/058556.

International Search Report and Written Opinion dated Dec. 24, 2020 in related International Patent Application No. PCT/IB2020/058559.

International Search Report and Written Opinion dated Dec. 24, 2020 in related International Patent Application No. PCT/IB2020/058564.

Notice of Allowance dated Apr. 2, 2021 in related U.S. Appl. No. 16/577,745.

Notice of Allowance dated Aug. 3, 2021 in related U.S. Appl. No. 16/577,749.

* cited by examiner

SYSTEMS AND METHODS FOR UPDATING DETECTION MODELS AND MAINTAINING DATA PRIVACY

FIELD

The present application generally relates to systems for evaluating and sharing detection models while maintaining data privacy and methods for using the same.

BACKGROUND

Analytical models for event detection are important to a range of fields and industries. For example, various analytical models are used to detect banking fraud, aid in regulatory compliance, and many other complex, data-driven problems. Many fields require the most up-to-date models for accurate and timely event detection. In some fields, for example, many types of fraud, a third party is agent is actively working to escape detection by current analytical models. Thus, what is needed is a system for updating detection models that allows a model update to be distributed, analyzed, and implemented in a rapid fashion over multiple local nodes of the system. Further, because manual creation of updated detection models can be a slow and time consuming process, what is needed is a system that creates its own model updates from successful event detection and then distributes the created model update to the rest of the system while maintaining data privacy of the location that created the model update.

SUMMARY

Embodiments herein provide a system for updating detection models, comprising: at least one local node comprising: a monitoring module; a diagnosis module; an evaluation module; one or more current detection models; and system data produced by the current detection models; and a memory comprising instructions, which are executed by at least one processor, configured to: receive, by the monitoring module, a model update; determine, by the diagnosis module, the current detection models; determine, by the evaluation module, if the model update should be applied to the current detection models; determine, by the evaluation module, if the local node has permission to apply the model update; and update, by the evaluation module, the current detection models with the model update.

In some embodiments, the system further comprises at least a second local node; a central module, wherein the monitoring module of each local node is in electronic communication with the central module; and a database of all available models for the system in electronic communication with the central module; and a memory comprising instructions, which are executed by at least one processor, configured to: create a model update, comprising: detecting, by the diagnosis module, a significant change in system data; determining, by the diagnosis module, a list of all current detection models involved with the detection step; analyzing, by the diagnosis module, the system data involved with the detection step; generating, by the diagnosis module, the model update; transmitting, by the monitoring module; the model update distribute a model update, comprising: receiving, by the central module, the model update; analyzing, by the central module, the database of available models; determining, by the central module, a priority level for the model update; determining, by the central module, which local nodes should receive the model update; and transmitting, by the central module, the model update; and update at least one local node, comprising: receiving, by at least one monitoring module, a model update; determining, by at least one diagnosis module, the current detection models; determining, by at least one evaluation module, if the model update should be applied to the current detection models; determining, by at least one evaluation module, if the local node has permission to apply the model update; and updating, by at least evaluation module, the current detection models with the model update.

Embodiments herein also provide a computer implemented method in a data processing system comprising a processor and a memory comprising instructions which are executed by the processor to cause the processor to implement a system updating detection models, the method comprising: updating at least one local node, comprising: receiving, by a monitoring module of at least one local node, a model update; determining, by a diagnosis module of the local node, the current detection models in use by the local node; determining, by an evaluation module of the local node, if the model update should be applied to the current detection models; determining, by the evaluation module of the local node, if the local node has permission to apply the model update; and updating, by the evaluation module of the local node, the current detection models with the model update.

Embodiments here also provide a computer program product for updating detection models, the computer program product comprising at least one computer readable storage medium having program instructions embodied therewith, the program instructions executable by a processor to cause the processor to update at least one local node by: receiving, by at least one monitoring module, the model update; determining, by at least one diagnosis module, the current detection models; determining, by at least one evaluation module, if the model update should be applied to the current detection models; determining, by at least one evaluation module, if the local node has permission to apply the model update; and updating, by at least evaluation module, the current detection models with the model update.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF THE EMBODIMENTS

Figure 1:
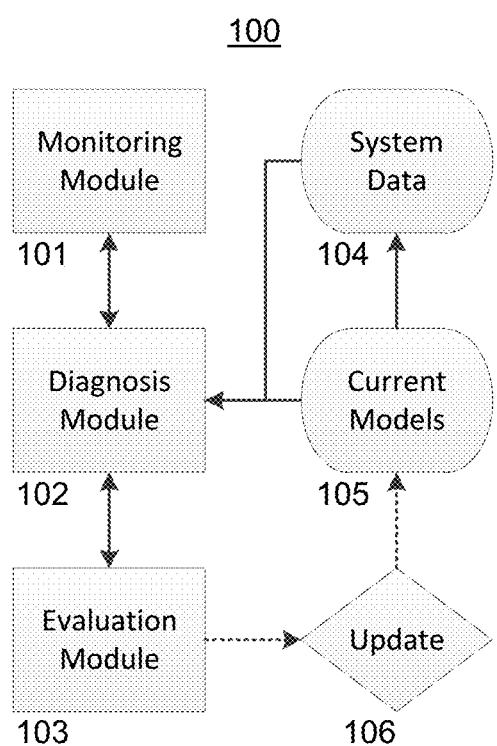
FIG. 1 depicts a block diagram of an exemplary update system comprising a single local node.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding
Ingest and process vast amounts of structured and unstructured data
Generate and evaluate hypotheses
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice, memorization and recall)
Predict and sense with situation awareness that mimic human cognition based on experiences
Answer questions based on natural language and specific evidence Embodiments herein relate to a system for updating analytical models across multiple local nodes. As used herein, an individual "local node" refers to software installed by an end user, such as an individual person or a corporation. In some embodiments the local node comprises one computer system. In some embodiments, the local node comprises multiple computer systems or servers controlled by the end user. In some embodiments, each local node in the system uses a set of current analytical models that are specific to that local node. In some embodiments, each local node in the system accesses and analyzes system data produced by one or more analytical models. This system data is specific to each local node, and may comprise sensitive or confidential information.

As used herein, an individual "analytical model," or just "model" is a software algorithm designed to detect certain events using data analysis techniques. In some embodiments, the analytical models detect data anomalies. In some embodiments, the analytical models detect fraud events. In some embodiments, the data analysis techniques used by the analytical models include, but are not limited to, data preprocessing techniques, calculation of one or more statistical parameters, statistical ratios based on classifications or groups, calculation of probabilities, classification techniques such as data clustering and data matching, regression analysis, and gap analysis. In some embodiments, the software of the local node comprises one or more analytical models. In some embodiments, the software of the local node comprises one or more analytical models and deterministic rules. In some embodiments, the software of the local node comprises one or more analytical models for fraud detection. In some embodiments, the software of the local node comprises one or more analytical models for regulatory compliance or non-compliance. In some embodiments, the software of the local node comprises one or more models and deterministic rules for fraud detection. In some embodiments, the software of the local node comprises one or more models and deterministic rules for regulatory compliance or non-compliance.

In some embodiments, the update system receives one or more model updates and pushes those updates to applicable local nodes. In some embodiments, the update system pushes updates to all local nodes in the system. In some embodiments, the update system pushes updates to only selected local nodes. In some embodiments, the update system determines which local nodes receive the model update push.

In some embodiments, each individual local node that receives a model update checks that update against the current models of an analytical system, and, if applicable, the update system will update the current models. In some embodiments, the update system receives one or more manually created model updates. In some embodiments, the update system receives one or more model updates created by a local node of the update system. In some embodiments, the local nodes of the update system are connected by a central hub or module that itself is not a local node. In some embodiments, the local modes of the update system are connected directly to each other, for example, as a decentralized network.

In some embodiments, the update system, including any local nodes, is a stand-alone system that creates and pushes model updates for any software system that uses analysis models. In some embodiments, the update system is itself a component or subsystem of a larger analytical system, for example, an analytical system for fraud detection.

FIG. 1 depicts a block diagram representation of components, outputs and data flows of an exemplary single local node of an update system 100. The local node comprises three main modules, or subsystems: a monitoring module 101, a diagnosis module 102, and an evaluation module 103.

The monitoring module 101 monitors one or more factors to determine if a model update process is required. In some embodiments, the monitoring module 101 checks the time since the last update process and initiates an update process if enough time has passed. In some embodiments, the monitoring module 101 initiates an update process if 6 hours, 12 hours, 1 day, 2 days, 3 days, 4 days, 5 days, 6 days, 7 days, 10 days, 15 days, 30 days, 1 month, 2 months, 3 months, 6 months, or 1 year has passed since the last update process. In some embodiments, the monitoring module 101 initiates an update process if it receives a model update pushed from a source external to the local node 100. For example, the monitoring module 101 can receive a model update pushed from a central module of the update system, another local node, or directly from an update system administrator.

In some embodiments, the monitoring module 101 can initiate an update process if signaled by the diagnosis module 102. In some embodiments, the diagnosis module 102 analyzes system data 104 and can signal the monitoring module 201 to initiate an update process if one or more data thresholds have been met. For example, the diagnosis module 102 can signal the monitoring module 101 if the diagnosis module's analysis of the system data 104 shows an increase in event detection above a data threshold value or a decrease in event detection below a data threshold value. In some embodiments, the data threshold value can be manually set, for example, by an end user. In some embodiments, the data threshold value can be automatically determined by the diagnosis module 102, for example, if the event detection rate increases by a significant value over the one week running average detection rate.

When an update process has been initiated, the monitoring module 101 will query for available model updates. In some embodiments, the monitoring module 101 will query a central module of the update system, another local mode, or an update system administrator. In some embodiments, if the update process was initiated by a model update pushed from a source external to the local node 100, then the monitoring module 101 will not query for additional available model updates. In some embodiments, if the update process was initiated by a model update pushed from a source external to the local node 100, the monitoring module 101 will still query for additional available model updates.

When the monitoring module 101 has completed all available queries and has received at least one model update, the monitoring module 101 will pass the model update to the diagnosis module 102. The diagnosis module 102 will compare the model update to a database of current models 105 available in the local node. In some embodiments, the diagnosis module 102 will categorize the model update to current models 105, whether those current models 105 are actively in use or not. In some embodiments the diagnosis module 102 will categorize the model update to the system data 104 generated by the application of the active current models 105.

When the diagnosis module 102 has received the model update and at least compared the model update to the database of current models 105, the diagnosis module 102 will pass the model update and all available comparison and other analytical data to the evaluation module 103. The evaluation module 103 will evaluate the model update to determine if the update 106 should be applied. In some embodiments, the evaluation module 103 will automatically apply the model update, changing or modify the current models 105 with the model update. In some embodiments, the evaluation module 103 will analyze the model update to determine if such a model already exists in the current model database 105. In some embodiments, the evaluation module 103 will run the model update against relevant system data 104 or relevant categorical data generated by the diagnosis module 102 to determine if the model update will provide the local node 100 with different system data than what the current models 105 can generate. In some embodiments, the evaluation module 103 will not automatically apply any updates or perform any analysis unless authorized by an end user or administrator of the local node 100.

Figure 2:
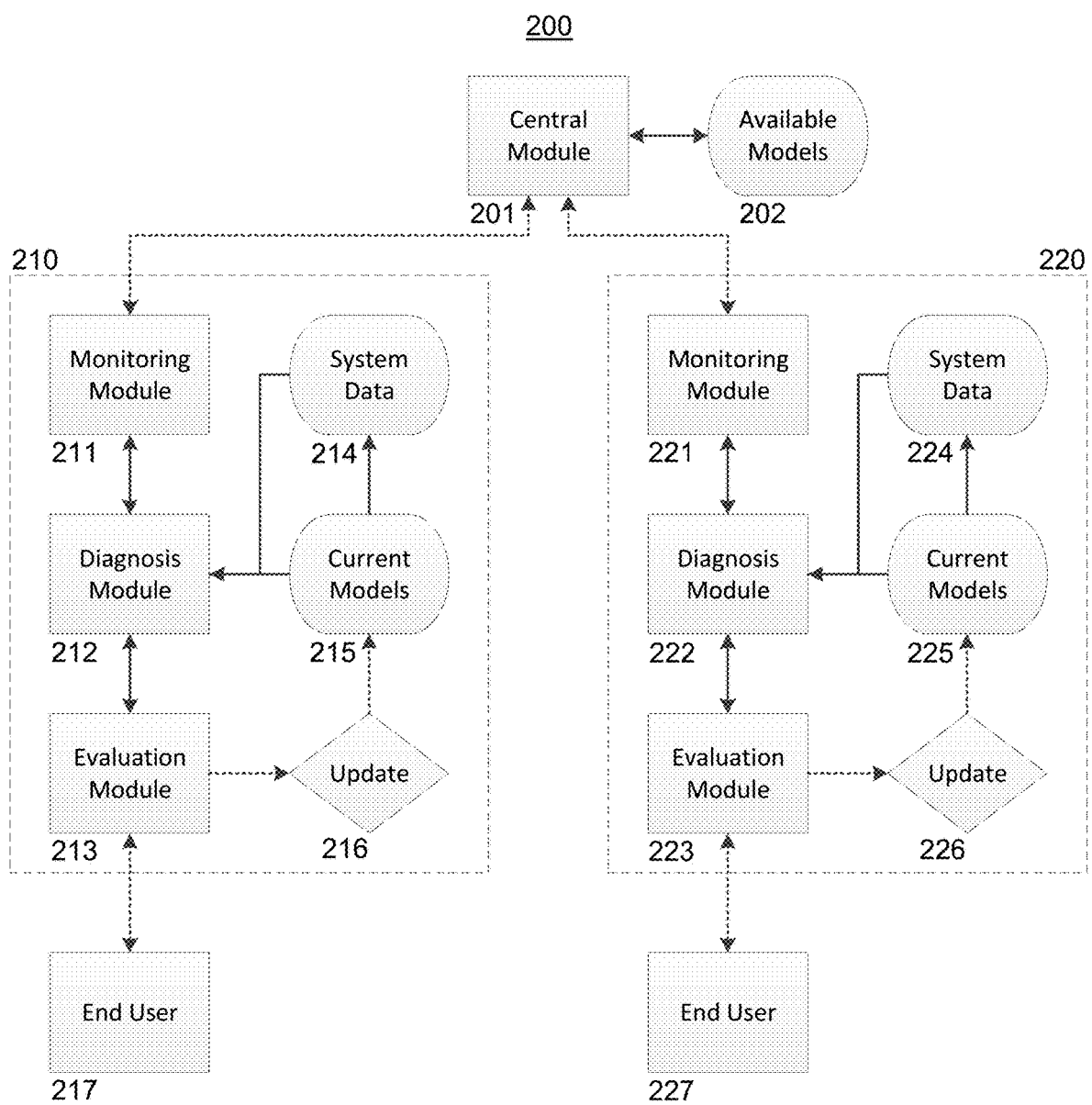
FIG. 2 depicts a block diagram of an exemplary update system comprising multiple local nodes connected by central module.

FIG. 2 depicts a block diagram representation components, outputs and data flows of an update system with multiple local nodes 200. The update system comprises a central module 201 that connects all local nodes in the update system 200. FIG. 2 depicts two local nodes, generally categorized as 210 and 220. In some embodiments, there is no limit to the number of local nodes that could be present in the update system 200. It should be appreciated that local nodes 210 and 220 are generally the same as the local node described in FIG. 1, with each comprising a monitoring module 211, 221, a diagnosis module 212, 222, and an evaluation module 213, 223. Each local node further comprises its own system data 214, 224 and database of current models 215, 225. It should be appreciated that each local node may have different system data and current models. In some embodiments, the system data 214 may or may not be identical or similar to system data 224. In some embodiments, the current models 215 may or may not be identical or similar to the current models 225.

The central module 201 does not exist in any local node, but rather in a separate location, such as a centralized administration server. In some embodiments, the central module 201 can send and receive information from monitoring modules 211, 221. In some embodiments, the central module 201 can send and receive information from any monitoring module in the update system. The central module 201 can access a master database of available models 202 to the update system. The database of available models 202 is a listing of all possible analytical models that currently exist in the update system. In some embodiments, a database of current models in an individual node, for example the current models 215, is equivalent to the dataset of available models 202. In some embodiments, a database of current models in an individual node, for example the current models 215, is not equivalent to the dataset of available models 202, but contains at least one model in common with the database of available models 202.

In some embodiments, when a monitoring module in an individual node, for example the monitoring module 211, initiates a query for available model updates, the monitoring module will electronically communicate with the central module 201.

In some embodiments, each individual node can communicate with one or more end users. In FIG. 2 for example, the evaluation module 213 of node 210 can communicate with end user 217. In some embodiments, any module of an individual node can communicate with an end user. In some embodiments, an individual node communicates with an end user to provide the end user with information regarding the update process. In some embodiments, an individual node communicates with an end user to provide the end user with information regarding the results of an update, for example, which models were updated. In some embodiments, an individual node communicates with an end user to ask the end user for authorization prior to updating any models.

Figure 3:
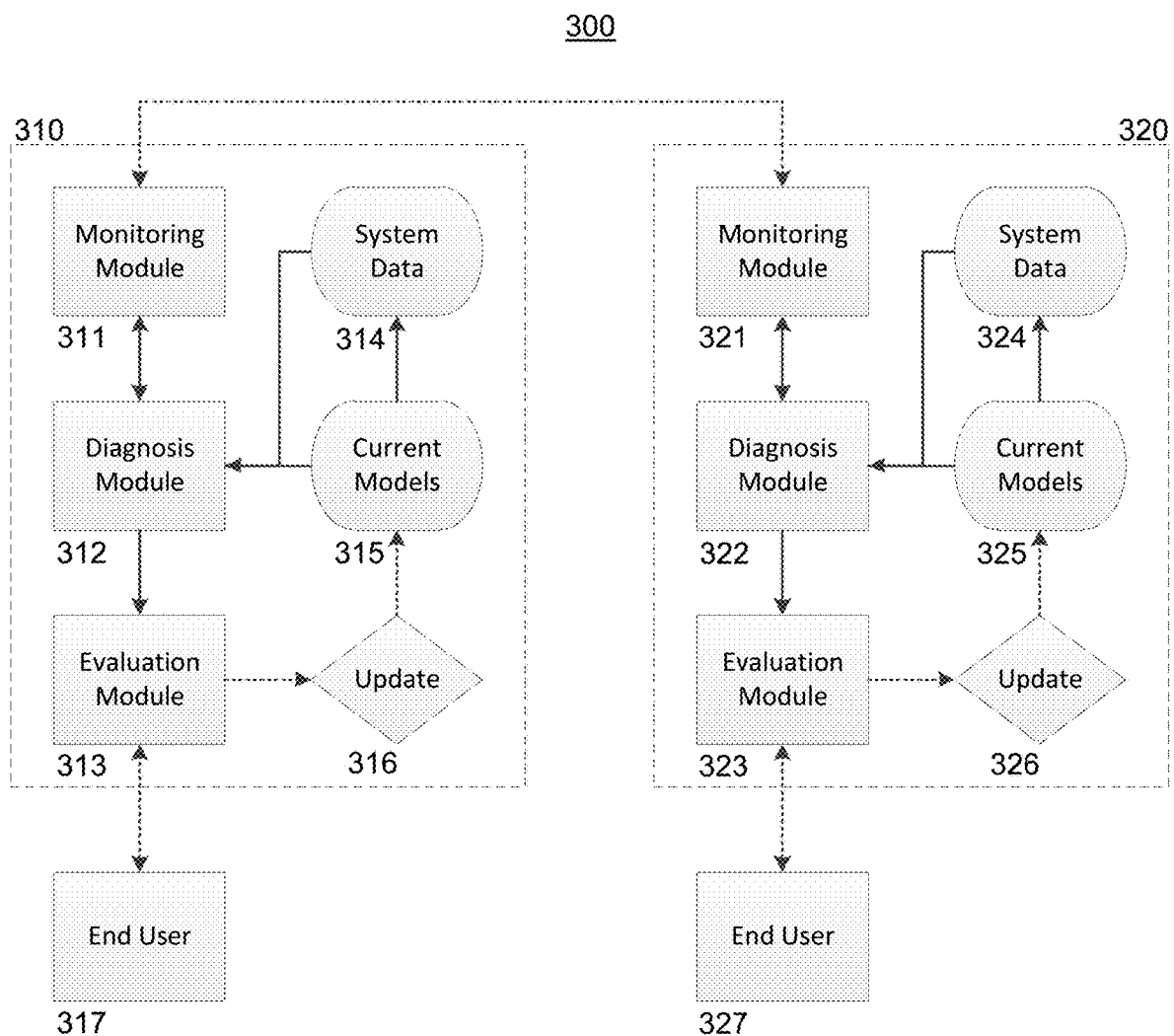
FIG. 3 depicts a block diagram of an exemplary update system comprising multiple, directly-connected local nodes.

FIG. 3 depicts another block diagram representation of components, outputs and data flows of an update system with multiple local nodes 300. The update system 300 depicts two local nodes, generally categorized as 310 and 320. In some embodiments, there is no limit to the number of local nodes that could be present in the update system 300. It should be appreciated that local nodes 310 and 320 are generally the same as the local nodes described in FIGS. 1 and 2, with each comprising a monitoring module 311, 321, a diagnosis module 312, 322, and an evaluation module 313, 323. Each local node further comprises its own system data 314, 324 and database of current models 315, 325. It should be appreciated that each local node may have different system data and current models. In some embodiments, the system data 314 may or may not be identical or similar to system data 324. In some embodiments, the current models 315 may or may not be identical or similar to the current models 325.

Unlike FIG. 2, the update system 300 does not have any type of central module that connects all of the local nodes. Instead, each local node is directly connected to each other via a network. In some embodiments, each monitoring module is in electronic communication with every other monitoring module in the update system 300. For example, as depicted in FIG. 3, the monitoring module 311 is in electronic communication with monitoring module 321.

In some embodiments, when an update process has been initiated in an individual node, the monitoring module of that node will query another local node in the update system 300. For example, when an update process has been initiated in local node 310, the monitoring module 311 will query monitoring module 321 of local node 320. In some embodiments, when an update process has been initiated in an individual node, the monitoring module of that node will query all other local nodes in the update system 300. In some embodiments, when an update process has been initiated in an individual node, the monitoring module of that node will query only selected other nodes in the update system 300. In some embodiments, when an update process has been initiated in an individual node, the monitoring module of that node will query only one other node in the update system 300.

In any embodiment herein, a system administrator can create an updated model and manually add it to the update system. For example, a system administrator can create an updated model and submit that model to the central module 201 as depicted in FIG. 2. As another example, a system administrator can create an updated model and submit that model to the monitoring module 321 as depicted in FIG. 3. In some embodiments, when an updated model has been added to any update system depicted herein, update process may be initiated throughout all of some of the nodes in the update system.

In any embodiment herein, any local node of an update system can originate a model update and automatically push it to the rest of the update system. In some embodiments, local nodes generating their own model updates is advantageous because it allows the update system to quickly respond to increases in fraud detection without end user or administrator involvement. For example, the diagnosis module 212 as depicted in FIG. 2 analyzes system data 214 and detects an increase in fraud detection greater than a pre-set threshold. The diagnosis module 212 proceeds to list the model or models that were used to detect the increase in fraud, and analyze the system data 214 to determine the critical features and conditions of the nexus between the model or models and the data. The diagnosis module 212 then strips the model of any specific data to the system data 214 and the local node 210. The monitoring module 211 then sends the model to the central module 201, which would then determine if the model is applicable as a model update for the update system 200.

In any embodiment where a local node is originating a model update for the update system, it is important that the specific system data of that local node is not shared with any central hub or other local node in the update system. In some embodiments, the diagnosis module creating the model to be shared with the update system creates a new model that is independent of any specific system data from the local node. In some embodiments, the new model comprises one or more of the following: one or more algorithms, create date and time, number of events detected over given time period, metadata or high level aggregate statistics such as total transactional value of time, and the threshold point or points used to trigger the update. In some embodiments, the new model comprises ratio statistics of one or more data group averages. In some embodiments, the new model can detect deviation from the ratio statistics of one or more data group averages to determine future positive results. In some embodiments, the new model comprises one or more network or image graphics that represent one or more models. In some embodiments, the new model comprises one or more network or image graphics that represent the new model.

In any of the embodiment herein, the components of the update system can be stored in the same location, for example, as installed software in an internal server system at a company, such as a bank. In some embodiments, some of the components of any update system disclosed herein are stored in different locations, such as part of a cloud-based service.

Figure 4:
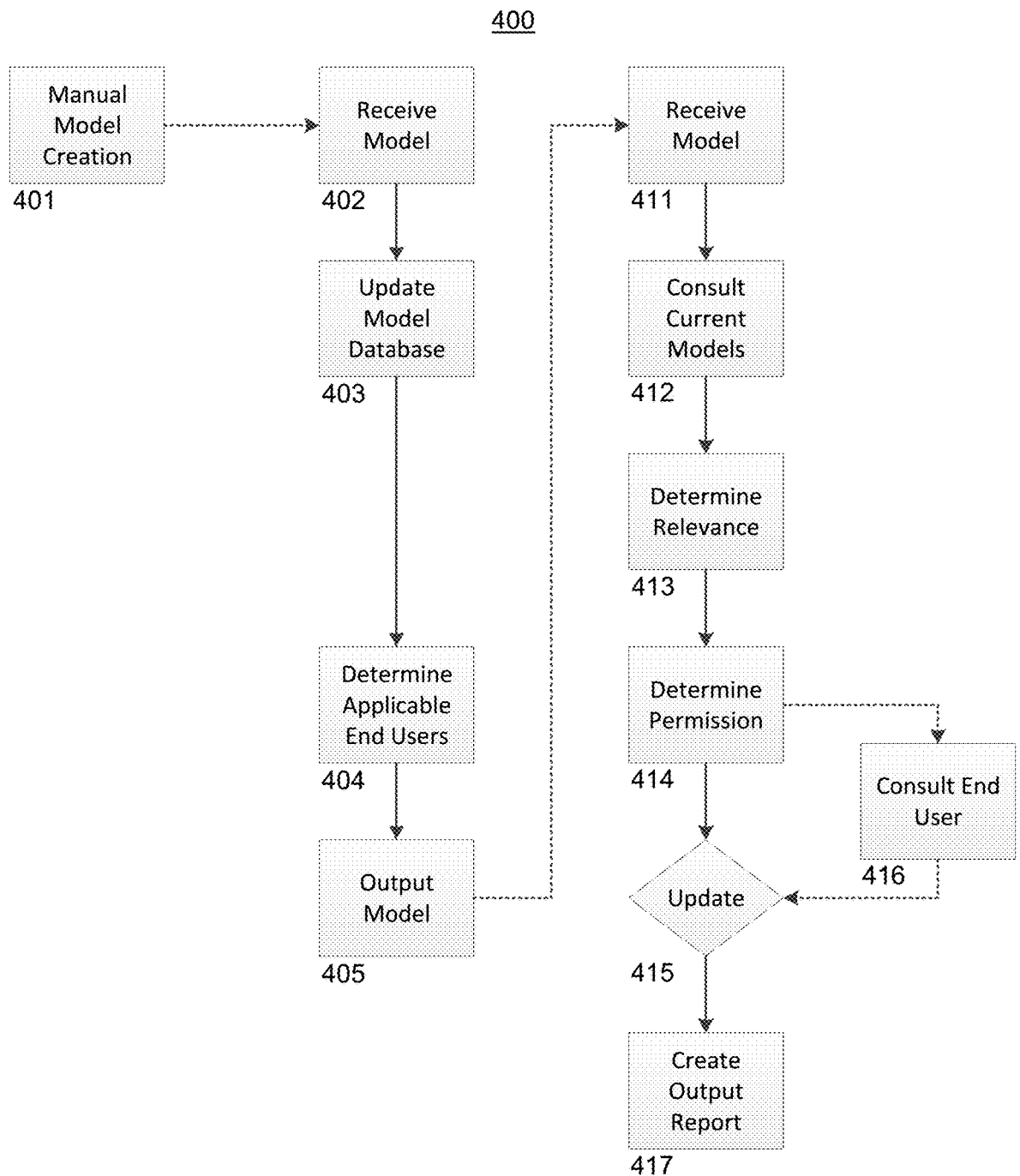
FIG. 4 depicts a flow chart of an exemplary method of updating analytical systems using an update system and a manually created model update.

FIG. 4 depicts a flow chart of an exemplary method of using a manually created model to push a model update in an update system with a central module 400. In some embodiments, method 400 can be used with the update system depicted in FIG. 2. First, a system administrator manually created a new model that will be used to update the system 401. In some embodiments, the new model comprises a new or updated algorithm or algorithms. In some embodiments, the new model comprises information on what criteria is necessary for the new model's use, for example, the type of business, the amount of system data required, or type of detection performed by the model. In some embodiments, the new model comprises priority information on how critical the model is to the update system. For example, a new model that must be pushed out to all local nodes would be given the highest possible priority. In some embodiments, priority information is categorized as either low priority, medium priority, or high priority.

Next, the new model created by the system administrator is pushed to the update system, which receives the model 402. In some embodiments, a central module of an update system receives the model. Upon receiving the model 402, the central module then updates the model database 403. For example, the central module 201 would update the available models database 202 in update system 200 depicted in FIG. 2.

The update system would then determine the applicable end users for the new model 404. In some embodiments, the central module is determining which end users are applicable. In some embodiments, the central module determines which end users are applicable for the model update by comparing criteria information in the new model with information on each end user in addition to the priority information of the new model. For example, if the model update for credit card fraud detection has a medium priority, the central module will identify which local nodes in the update system are involved with credit card fraud detection and then push out the model 405 to those identified local nodes. The model update would not be pushed out to any remaining local nodes, however, when each of those remaining local nodes initiates an update process, for example, if enough time has gone by without an update to trigger the monitoring module, that local node may then receive the update. In another example, if the model update for credit card fraud detection has a high priority, the central module will output the model 405 to all local nodes. In another example, if the model update for credit card fraud detection has a low priority, the central module will not push out the model to any local node right away, and instead wait for each local node to initiate an update process on its own.

Once the model update has been sent out from the central module, it is received 411 by at least one local node. In some embodiments, the model update is received by multiple local nodes simultaneously. In some embodiments, the model update is received by the monitoring module in any of the embodiments described herein.

In some embodiments, once a local node has received a model update 411, it is not installed automatically. First, the local node will consult the current model database to see if the model update will replace any existing models 412. Then the local node will determine the relevance of the model update to the node 413. For example, in local node 210 of update system 200 depicted in FIG. 2, the model update is received by the monitoring module 211, and then passed along to the diagnosis module 212. The diagnosis module 212 first consults the current model database 215 and then determines the relevance of the model update to local node 210. In some embodiments, the diagnosis module 212 will end the update process after the determine relevance step 413. In some embodiments, the diagnosis module 212 will end the update process after the determine relevance step 413 if the diagnosis module 212 determines that the model update is not needed for the local node. In some embodiments, the diagnosis module 212 will end the update process after the determine relevance step 413 if the diagnosis module 212 determines that the model update is already present in the local node. In some embodiments, the diagnosis module 212 will automatically bypass the determine relevance step 413 if the model update carries a high priority.

In some embodiments, once the local node has determined that the model update would be relevant or necessary, the local node will determine if it has permission to apply the model update 414. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 416. For example, once the diagnosis module 212 has either determined that the model update is relevant or that the model update has a high enough priority to bypass the determine relevance step 413, the model update is passed along to the evaluation module 213. The evaluation module 213 then checks the update permission settings of the local node. In some embodiments, if the evaluation module 213 determines that it does not have permission to install the model update, the evaluation module 213 will end the update process. In some embodiments, the evaluation module 213 will consult an end user, for example, by issuing a user prompt or by sending an e-mail or other communication to the end user, before installing the model update.

The local node will install the model update once the local node determines that it has permission to do so 415. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation module 213 updates the current model database 215 with the model update.

In some embodiments, once the update 415 is complete, the local node creates an output report 417. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

Figure 5:
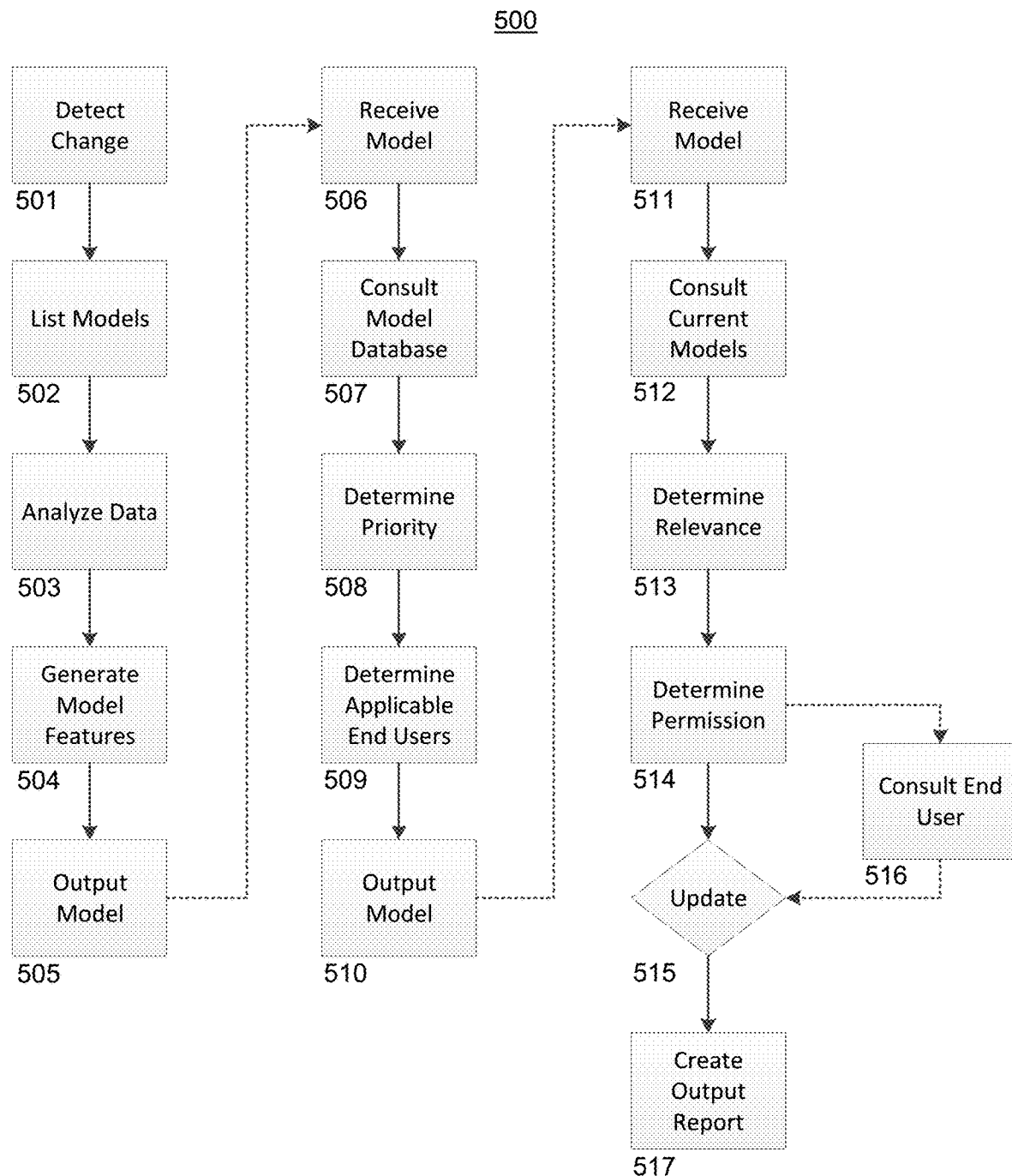
FIG. 5 depicts a flow chart of an exemplary method of updating analytical systems using a model update created by one of the local nodes; wherein the local nodes are connected by a central module.

FIG. 5 depicts a flow chart of an exemplary method of pushing a model update in an update system with a central module, where the model update was created automatically from a local node in the update system 500. In some embodiments, method 500 can be used with the update system depicted in FIG. 2. First, a local node in an update system will detect a change in the results from their existing models 501. In some embodiments, a local node in an update system will detect a change in fraud detection rates. In some embodiments, the change in fraud detection rates is an increase in fraud detection greater than a pre-set threshold. In some embodiments, the change in fraud detection rates is a significant increase or decrease in fraud over a given period of time. In some embodiments, a local node in an update system will detect a change in detected fraud magnitude. In some embodiments, the change in fraud magnitude is an increase in the value or dollar amount of a detected fraud event greater than a pre-set threshold. In some embodiments, the change in fraud magnitude is a significant increase in the value or dollar amount of a detected fraud event compared to a running average or mean of detected events. For example, the diagnosis module 212 as depicted in FIG. 2 analyzes system data 214 and detects an increase in the fraud detection rate that is greater than a standard deviation away from the 3-month running average fraud detection rate.

Once a change in the results from their existing models has been detected 501, the local node will list all of the models involved in that detection 502. In some embodiments, the local node will list all of the models directly involved with producing the events detected in step 501. In some embodiments, the local node will list all of the models directly and indirectly involved with producing the events detected in step 501. In some embodiments, the local node will list all actively running models when the events were detected in step 501. For example, the diagnosis module 212, with access to both the system data 214 and the current model database 215, will list all of the algorithmic models that were directly and indirectly involved with producing the fraud events that were previously detected in step 501.

Once a local node has listed the models 502 relevant to the detected change 501, the local node will analyze the data involved in producing the events that lead to the detected change 503. In some embodiments, the local node analyzes the system data to determine the features and conditions relevant to the models listed in step 502 in producing the events that were detected in step 501. In some embodiments, the local node analysis can include, but is not limited to, ordinary least squares, penalized regressions, generalized additive models, quantile regressions, logistical regressions, and gated linear models. In some embodiments, the local node analysis will be transformed variants of the relevant model or models that reduce the complexity of those models. For example, placing monotonicity constraints on a non-linear, non-monotonic model to orient the model around variable relationship known to be true, or the utilization of monotonic neural networks for machine learning applications. In some embodiments, the relevant visualizations will be related but less complex models that approximate the applicable model or models, especially machine learning models. For example, surrogate models, local interpretable model-agnostic explanations (LIME), maximum activation analysis, linear regression, and sensitivity analysis.

Once a local node has listed the models 502 and analyzed the relevant data 503, the local node can then generate the features of the model update 504 that will be sent to the rest of the update system. In some embodiments, a diagnostic module of a local node generates the model features 504. In some embodiments, the features of the model update are local node agnostic, i.e., the model update is usable by any of the local nodes in the update system. Therefore, the model update generated by the local node is stripped of any specific data of that local node. In some embodiments, the model update features comprise one or more of the following: one or more algorithms, creation date and time, number of events detected over given time period, metadata or high level aggregate statistics such as total transactional value of time, and the threshold point or points used to trigger the update. In some embodiments, the model update features comprise ratio statistics of one or more data group averages. In some embodiments, the model update can detect deviation from the ratio statistics of one or more data group averages to determine future positive results. In some embodiments, the model update features comprise one or more network or image graphics that represent one or more models. In some embodiments, the model update features comprise one or more network or image graphics that represent the new model.

Once a local node has generated the model features 504, the local node can output the model update 505. In some embodiments, the local node will output the model update to a central module of the update system, which receives the model update 506. For example, the monitoring module 211 of local node 210 can receive a model update from the diagnosis module 212, and then the monitoring module 211 can send the model update to the central module 201, which receives the model update.

Upon receiving a model update from a local node 506, a central module of an update system will then consult a model database 507. In some embodiments, the central module consults a model database to determine if the model update is already present. In some embodiments, the central module consults a model database to determine if the model update replaces an existing model in the database or is a novel model to the database. In some embodiments, when the central module consults a model database and determines that the model update could replace or modify an existing model in the database, the central module can pull model information on the existing model. In some embodiments, model information can include one or more of the following: model creation date and time, date and time of when the model was last updated, and how many local nodes currently use the model. For example, upon receiving the model update from local node 210, the central module 201 checks the model update against the available model database 202. The central module 201 determines if the model update already exists in the available model database 202, and if it does, the central module 201 will pull relevant information on any existing model.

After the central module of an update system consults a model database 507, the central module will then determine the priority level of the model update 508. In some embodiments, the priority level of the model update will be listed as high, medium, or low. In some embodiments, the priority level of the model update will be listed on a numerical scale, for example, between a range of 1 to 10 or other common numerical range. In some embodiments, the central module determines the priority level of the model update by comparing the model update features to a pre-determined scale. In some embodiments, the central module determines the priority level of the model update by comparing the model update features to a model database. In some embodiments, the central module determines the priority level of the model update by comparing the model update features to model information stored in an existing model database. In some embodiments, the comparison of the model update features to the existing model information results in a priority grade, which is then turned into a priority level.

For example, after the central module 201 of update system 200 checks the model update for credit card fraud detection against the available model database 202, the central module 201 determines that a similar model already exists in the database and pulls information on the existing model. The central module 201 then compares the model update features to the existing model information and calculates a priority grade. As a first example, the central module determines that the existing model for credit card fraud detection has not been updated in over a year, that the model update is a direct replacement for the existing model, and that the model update can increase performance of detecting credit card fraud over a range of use conditions. These differences result in a high priority grade, which the central module 201 turns into a high priority level. As a second example, the central module determines that the existing model for credit card fraud detection has been recently updated, and that the model update would only be expected to increase performance of detecting credit card fraud with a large enough user base that only few end users are known to have. These differences result in a relatively lower priority grade, which the central module 201 turns into a medium priority level.

After determining priority, the update system would then determine the applicable end users for the new model 509. In some embodiments, the central module is determining which end users are applicable. In some embodiments, the central module determines which end users are applicable for the model update by comparing the model update features with information on each end user, in addition to the priority information of the new model. For example, if the model update for credit card fraud detection has a medium priority, the central module will identify which local nodes in the update system are involved with credit card fraud detection and then push out the model 510 to those identified local nodes. The model update would not be pushed out to any remaining local nodes, however, when each of those remaining local nodes initiates an update process, for example, if enough time has gone by without an update to trigger the monitoring module, that local node may then receive the update. In another example, if the model update for credit card fraud detection has a high priority, the central module will output the model 510 to all local nodes. In another example, if the model update for credit card fraud detection has a low priority, the central module will not push out the model to any local node right away, and instead wait for each local node to initiate an update process on its own.

Once the model update has been sent out from the central module, it is received by at least one local node 511. In some embodiments, the model update is received by multiple local nodes simultaneously. In some embodiments, the model update is received by the monitoring module in any of the embodiments described herein.

In some embodiments, once a local node has received a model update 511, it is not installed automatically. First, the local node will consult the current model database to see if the model update will replace any existing models 512. Then the local node will determine the relevance of the model update to the node 513. For example, in local node 210 of update system 200 depicted in FIG. 2, the model update is received by the monitoring module 211, and then passed along to the diagnosis module 212. The diagnosis module 212 first consults the current model database 215 and then determines the relevance of the model update to local node 210. In some embodiments, the diagnosis module 212 will end the update process after the determine relevance step 513. In some embodiments, the diagnosis module 212 will end the update process after the determine relevance step 513 if the diagnosis module 212 determines that the model update is not needed for the local node. In some embodiments, the diagnosis module 212 will end the update process after the determine relevance step 513 if the diagnosis module 212 determines that the model update is already present in the local node. In some embodiments, the diagnosis module 212 will automatically bypass the determine relevance step 513 if the model update carries a high priority.

In some embodiments, once the local node has determined that the model update would be relevant or necessary, the local node will determine if it has permission to apply the model update 514. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 516. For example, once the diagnosis module 212 has either determined that the model update is relevant or that the model update has a high enough priority to bypass the determine relevance step 513, the model update is passed along to the evaluation module 213. The evaluation module 213 then checks the update permission settings of the local node. In some embodiments, if the evaluation module 213 determines that it does not have permission to install the model update, the evaluation module 213 will end the update process. In some embodiments, the evaluation module 213 will consult an end user, for example, by issuing a user prompt or by sending an e-mail or other communication to the end user, before installing the model update.

The local node will install the model update once the local node determines that it has permission to do so 515. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation module 213 updates the current model database 215 with the model update.

In some embodiments, once the update 515 is complete, the local node creates an output report 517. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

Figure 6:
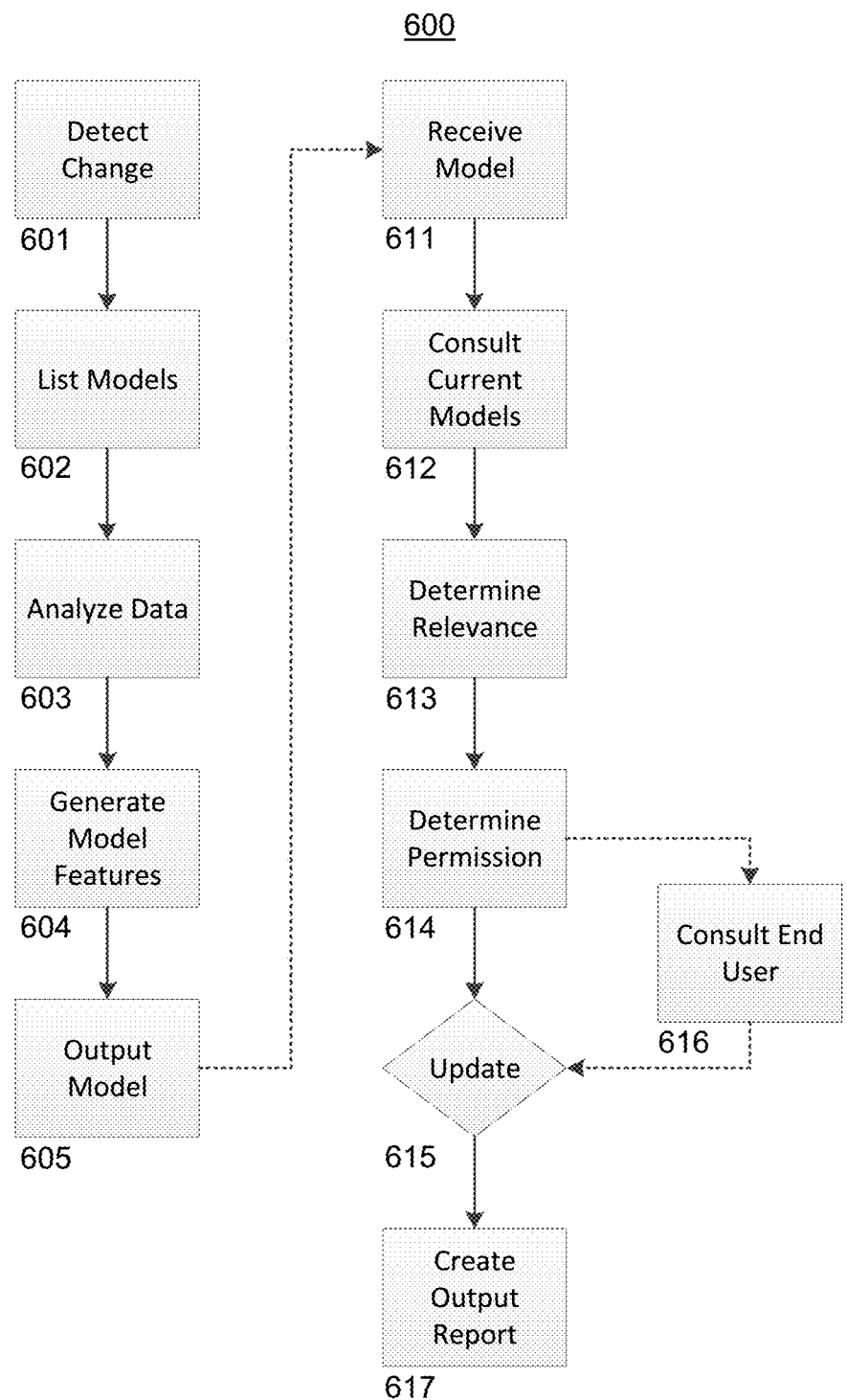
FIG. 6 depicts a flow chart of an exemplary method of updating analytical systems using a model updated created by one of the local nodes, wherein the local nodes are directed connected.

FIG. 6 depicts a flow chart of an exemplary method of pushing a model update in an update system without a central module, where the model update was created automatically from a local node in the update system 600. In some embodiments, method 600 can be used with the update system depicted in FIG. 3. First, a local node in an update system will detect a change in the results from their existing models 601. In some embodiments, a local node in an update system will detect a change in fraud detection rates. In some embodiments, the change in fraud detection rates is an increase in fraud detection greater than a pre-set threshold. In some embodiments the change in fraud detection rates is a significant increase or decrease in fraud over a given period of time. In some embodiments, a local node in an update system will detect a change in detected fraud magnitude. In some embodiments, the change in fraud magnitude is an increase in the value or dollar amount of a detected fraud event greater than a pre-set threshold. In some embodiments, the change in fraud magnitude is a significant increase in the value or dollar amount of a detected fraud event compared to a running average or mean of detected events. For example, the diagnosis module 312 as depicted in FIG. 3 analyzes system data 314 and detects an increase in the fraud detection rate that is greater than a standard deviation away from the 3-month running average fraud detection rate.

Once a change in the results from their existing models has been detected 601, the local node will list all of the models involved in that detection 602. In some embodiments, the local node will list all of the models directly involved with producing the events detected in step 601. In some embodiments, the local node will list all of the models directly and indirectly involved with producing the events detected in step 601. In some embodiments, the local node will list all actively running models when the events were detected in step 601. For example, the diagnosis module 312, with access to both the system data 314 and the current model database 315, will list all of the algorithmic models that were directly and indirectly involved with producing the fraud events that were previously detected in step 601.

Once a local node has listed the models 602 relevant to the detected change 601, the local node will analyze the data involved in producing the events that lead to the detected change 603. In some embodiments, the local node analyzes the system data to determine the features and conditions relevant to the models listed in step 602 in producing the events that were detected in step 601. In some embodiments, the local node analysis can include, but is not limited to, ordinary least squares, penalized regressions, generalized additive models, quantile regressions, logistical regressions, and gated linear models. In some embodiments, the local node analysis will be transformed variants of the relevant model or models that reduce the complexity of those models. For example, placing monotonicity constraints on a non-linear, non-monotonic model to orient the model around variable relationship known to be true, or the utilization of monotonic neural networks for machine learning applications. In some embodiments, the relevant visualizations will be related but less complex models that approximate the applicable model or models, especially machine learning models. For example, surrogate models, local interpretable model-agnostic explanations (LIME), maximum activation analysis, linear regression, and sensitivity analysis.

Once a local node has listed the models 602 and analyzed the relevant data 603, the local node can then generate the features of the model update 604 that will be sent to the rest of the update system. In some embodiments, a diagnostic module of a local node generates the model features 604. In some embodiments, the features of the model update are local node agnostic, i.e., the model update is usable by any of the local nodes in the update system. Therefore, the model update generated by the local node is stripped of any specific data of that local node. In some embodiments, the model update features comprise one or more of the following: one or more algorithms, creation date and time, number of events detected over given time period, metadata or high level aggregate statistics such as total transactional value of time, and the threshold point or points used to trigger the update. In some embodiments, the model update features comprise ratio statistics of one or more data group averages. In some embodiments, the model update can detect deviation from the ratio statistics of one or more data group averages to determine future positive results. In some embodiments, the model update features comprise one or more network or image graphics that represent one or more models. In some embodiments, the model update features comprise one or more network or image graphics that represent the new model.

Once a local node has generated the model features 604, the local node can output the model update 605. In some embodiments, the local node will output the model update to at least one other local node of the update system, which receives the model update 611. In some embodiments, the local node will output the model update to all other local nodes of the update system. For example, the monitoring module 311 of local node 310 can receive a model update from the diagnosis module 312, and then the monitoring module 311 can send the model update to the other local node 320, which receives the model update.

In some embodiments, once a local node has received a model update 611, it is not installed automatically. First, the local node will consult the current model database to see if the model update will replace any existing models 612. Then the local node will determine the relevance of the model update to the node 613. For example, in local node 310 of update system 300 depicted in FIG. 3, the model update is received by the monitoring module 311, and then passed along to the diagnosis module 312. The diagnosis module 312 first consults the current models database 315 and then determines the relevance of the model update to local node 310. In some embodiments, the diagnosis module 312 will end the update process after the determine relevance step 613. In some embodiments, the diagnosis module 312 will end the update process after the determine relevance step 613 if the diagnosis module 312 determines that the model update is not needed for the local node. In some embodiments, the diagnosis module 312 will end the update process after the determine relevance step 613 if the diagnosis module 312 determines that the model update is already present in the local node.

In some embodiments, once the local node has determined that the model update would be relevant or necessary, the local node will determine if it has permission to apply the model update 614. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 616. For example, once the diagnosis module 312 has determined that the model update is relevant, the model update is passed along to the evaluation module 313. The evaluation module 313 then checks the update permission settings of the local node. In some embodiments, if the evaluation module 313 determines that it does not have permission to install the model update, the evaluation module 313 will end the update process. In some embodiments, the evaluation module 313 will consult an end user, for example, by issuing an user prompt or by sending an e-mail or other communication to the end user, before installing the model update.

The local node will install the model update once the local node determines that it has permission to do so 615. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation model 313 updates the current model database 315 with the model update.

In some embodiments, once the update 615 is complete, the local node creates an output report 617. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

In some embodiments, the user of any of the systems disclosed herein can be one or more human users, as known as "human-in-the-loop" systems. In some embodiments, the user of any of the systems disclosed herein can be a computer system, artificial intelligence ("AI"), cognitive or non-cognitive algorithms, and the like.

The following table is a non-exclusive and non-exhaustive list of examples using any of the systems and methods disclosed herein.

---

A credit card company uses multiple analytical models to evaluate transactional credit fraud. The models detect abnormal variations in fraud events, which are analyzed by the diagnosis module of the update system. The diagnosis module triggers the monitoring module to check to see if any model updates are available from a central module server, so that the system has the most up-to-date models to analyze the abnormal variations.

An insurance company uses multiple analytical models to produce an ensemble result used in investigations of insurance fraud. In producing their result, some of the models show a significant increase in a specific type of fraud detection under certain circumstances. The diagnosis module detects this significant increase, and creates a model update that includes the models that show the increase, the date and time of the event detection, which type of fraud was detected, and under which general circumstances the fraud was detected. The diagnosis module strips out any specific company data from the model update, creating a general model that can be applied to any system data. The monitoring module then transmits this new model update to a central module server, where the update is analyzed and given a priority level, and then transmitted in turn to other local nodes/end users in the update system.

A bank employs a feedback mechanism that combines the analytical results from several models with human investigative results to determine that a new type of fraud is increasing in frequency. The feedback of human results is used by the diagnosis module to determine the specific model features that are used to detect this emergent fraud. The diagnosis module communicates to the monitoring module the model features that are used to detect this new type of fraud and triggers feature generation so that existing models can use these new features to perform better detection.

An insurance company uses a variety of models to perform event detection analysis, the results of which are send to another model that looks at detection trends over time. This trend analysis discovers that certain types of event detections increase in frequency during certain time frames, for example, during natural weather events. The diagnosis module communicates this trend analysis result to the monitoring module, which is then transmitted the information to a central server. The trend analysis update is then transmitted to certain other local nodes.

---

Figure 7:
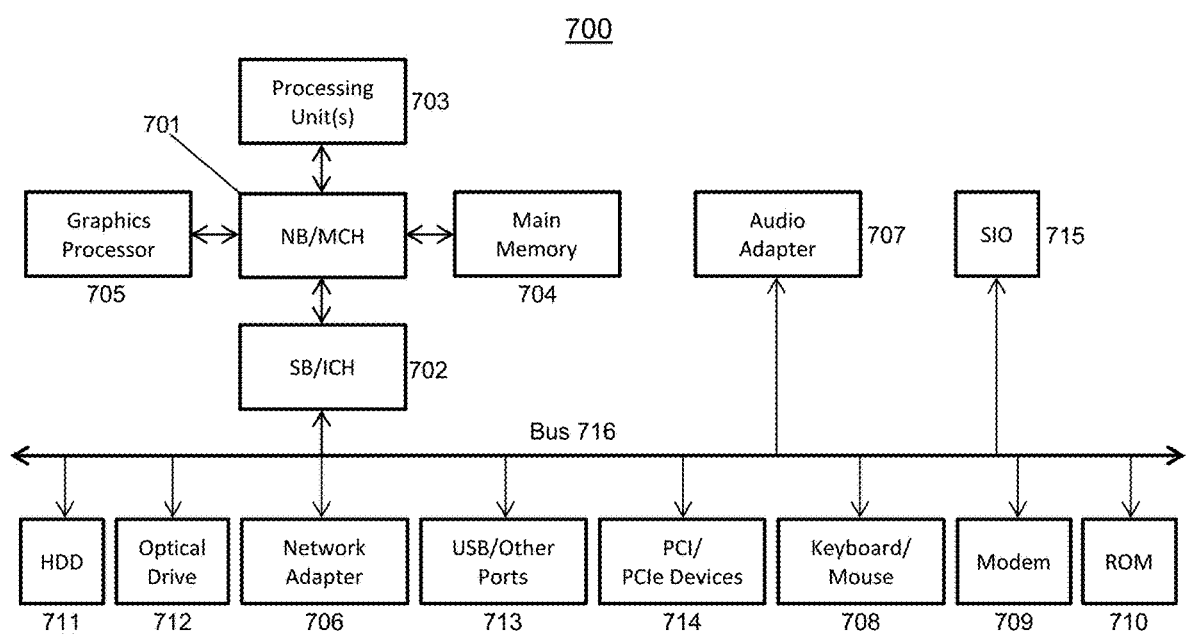
FIG. 7 depicts a block diagram of an example data processing system in which aspect of the illustrative embodiments may be implemented.

FIG. 7 depicts a block diagram of an example data processing system 700 in which aspects of the illustrative embodiments are implemented. Data processing system 700 is an example of a computer, such as a server or client, in which computer usable code or instructions implementing the process for illustrative embodiments of any of the disclosures described herein are located. In some embodiments, FIG. 7 represents a server computing device, such as a server, which implements the system for interpreting analytical results described herein.

In the depicted example, data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through an accelerated graphics port (AGP). The network adapter 706 connects to the SB/ICH 702. The audio adapter 707, keyboard and mouse adapter 708, modem 709, read only memory (ROM) 710, hard disk drive (HDD) 711, optical drive (CD or DVD) 712, universal serial bus (USB) ports and other communication ports 713, and the PCI/PCIe devices 714 can connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. The super I/O (S/O) device 715 can be connected to the SB/ICH 702.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System P® running the Advanced Interactive Executive operating system or the LINUX® operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the medical record error detection system can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or network adapter 706 can include one or more devices that can be used to transmit and receive data.

Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A system for updating detection models, comprising:
   at least one local node comprising:
      a monitoring module;
      a diagnosis module;
      an evaluation module;
      one or more current detection models; and
      system data produced by the current detection models; and
   a memory comprising instructions, which are executed by at least one processor, configured to:
   detect, by the diagnosis module, a change in the system data;
   determine, by the diagnosis module, a list of all current detection models involved with the detection step;
   analyze, by the diagnosis module, the system data involved with the detection step;
   generate, by the diagnosis module, a model update, wherein the generated model update does not comprise any system data specific to a local node that generated the model update;
   receive, by the monitoring module, the model update;
   determine, by the diagnosis module, the current detection models;
   determine, by the evaluation module, if the model update should be applied to the current detection models;
   determine, by the evaluation module, if the local node has permission to apply the model update;
   update, by the evaluation module, the current detection models with the model update; and
   create, by the evaluation module, an output report including a type of updated detection models, whether any old detection models were replaced, a date and time of the model update, and whether the updated detection models are currently active.

2. The system of claim 1, wherein the system further comprises at least two local nodes, wherein the system further comprises a central module, and wherein the monitoring module of each local node is in electronic communication with the central module.

3. The system of claim 2, wherein the system further comprises a database of all available models for the system in electronic communication with the central module.

4. The system of claim 2, wherein the monitoring module is configured to receive model updates.

5. The system of claim 4, wherein the monitoring module can receive a model update from a system administrator or from a local node.

6. The system of claim 1, wherein the generated model update comprises one or more algorithms, creation date and time, number of events detected over given time period, aggregate statistics, and the threshold point or points used to trigger the model update.

7. The system of claim 1, further comprising:
   at least a second local node;
   a central module, wherein the monitoring module of each local node is in electronic communication with the central module; and
   a database of all available models for the system in electronic communication with the central module; and
   a memory comprising instructions, which are executed by at least one processor, configured to:
   create a model update, comprising:
      detecting, by the diagnosis module, a change in system data;
      determining, by the diagnosis module, a list of all current detection models involved with the detection step;
      analyzing, by the diagnosis module, the system data involved with the detection step, by one or more of ordinary least squares, penalized regressions, generalized additive models, quantile regressions, logistical regressions, and gated linear models;
      generating, by the diagnosis module, the model update; and
      transmitting, by the monitoring module, the model update;
   distribute a model update, comprising:
      receiving, by the central module, the model update;
      analyzing, by the central module, the database of available models;
      determining, by the central module, a priority level for the model update;
      determining, by the central module, which local nodes should receive the model update; and
      transmitting, by the central module, the model update; and
   update at least one local node, comprising:
      receiving, by at least one monitoring module, a model update;
      determining, by at least one diagnosis module, the current detection models;
      determining, by at least one evaluation module, if the model update should be applied to the current detection models;

determining, by the at least one evaluation module, if the local node has permission to apply the model update; and updating, by the at least one evaluation module, the current detection models with the model update.

8. A computer implemented method in a data processing system comprising a processor and a memory comprising instructions which are executed by the processor to cause the processor to implement a system updating detection models, the method comprising:

creating a model update, comprising:
   detecting, by the diagnosis module, a change in system data;
   determining, by the diagnosis module, a list of all current detection models involved with the detection step;
   analyzing, by the diagnosis module, the system data involved with the detection step, by one or more of ordinary least squares, penalized regressions, generalized additive models, quantile regressions, logistical regressions, and gated linear models; and
   generating, by the diagnosis module, the model update, wherein the generated model update does not comprise any system data specific to a local node that generated the model update;

updating at least one local node, comprising:
   receiving, by a monitoring module of at least one local node, the model update;
   determining, by a diagnosis module of the local node, the current detection models in use by the local node;
   determining, by an evaluation module of the local node, if the model update should be applied to the current detection models;
   determining, by the evaluation module of the local node, if the local node has permission to apply the model update;
   updating, by the evaluation module of the local node, the current detection models with the model update; and
   creating, by the evaluation module of the local node, an output report including a type of updated detection models, whether any old detection models were replaced, a date and time of the model update, and whether the updated detection models are currently active.

9. The method of claim 8, wherein the method further comprises updating at least two local nodes.

10. The method of claim 9, wherein the method further comprises distributing, by a central module, the model update.

11. The method of claim 10, wherein the method further comprises analyzing, by the central module, a database of available models.

12. The method of claim 10, wherein the method further comprises determining, by the central module, a priority level of the model update.

13. The method of claim 10, wherein the method further comprises determining, by the central module, which local nodes should receive the model update.

14. The method of claim 8, wherein the generated model update comprises one or more algorithms, creation date and time, number of events detected over given time period, aggregate statistics, and the threshold point or points used to trigger the model update.

15. The method of claim 8, further comprising:

creating a model update, comprising:
   detecting, by the diagnosis module, a change in system data;
   determining, by the diagnosis module, a list of all current detection models involved with detecting the change;
   analyzing, by the diagnosis module, the system data involved with detecting the change, by one or more of ordinary least squares, penalized regressions, generalized additive models, quantile regressions, logistical regressions, and gated linear models;
   generating, by the diagnosis module, the model update; and
   transmitting, by the monitoring module, the model update;

distributing the model update, comprising:
   receiving, by a central module, the model update;
   analyzing, by the central module, a database of available models;
   determining, by the central module, a priority level for the model update;
   determining, by the central module, which local nodes should receive the model update; and
   transmitting, by the central module, the model update to at least one local node; and updating at least one local node, comprising:
   receiving, by at least one monitoring module, the model update;
   determining, by at least one diagnosis module, the current detection models;
   determining, by at least one evaluation module, if the model update should be applied to the current detection models;
   determining, by the at least one evaluation module, if the local node has permission to apply the model update; and
   updating, by the at least one evaluation module, the current detection models with the model update.

16. The method of claim 8, wherein the model update includes one or more network or image graphics representing the updated detection models.

* * * * *